July 6, 1937. J. CEREGHINO 2,085,737
CAN SOLDERING MACHINE
Filed April 13, 1933 3 Sheets-Sheet 1
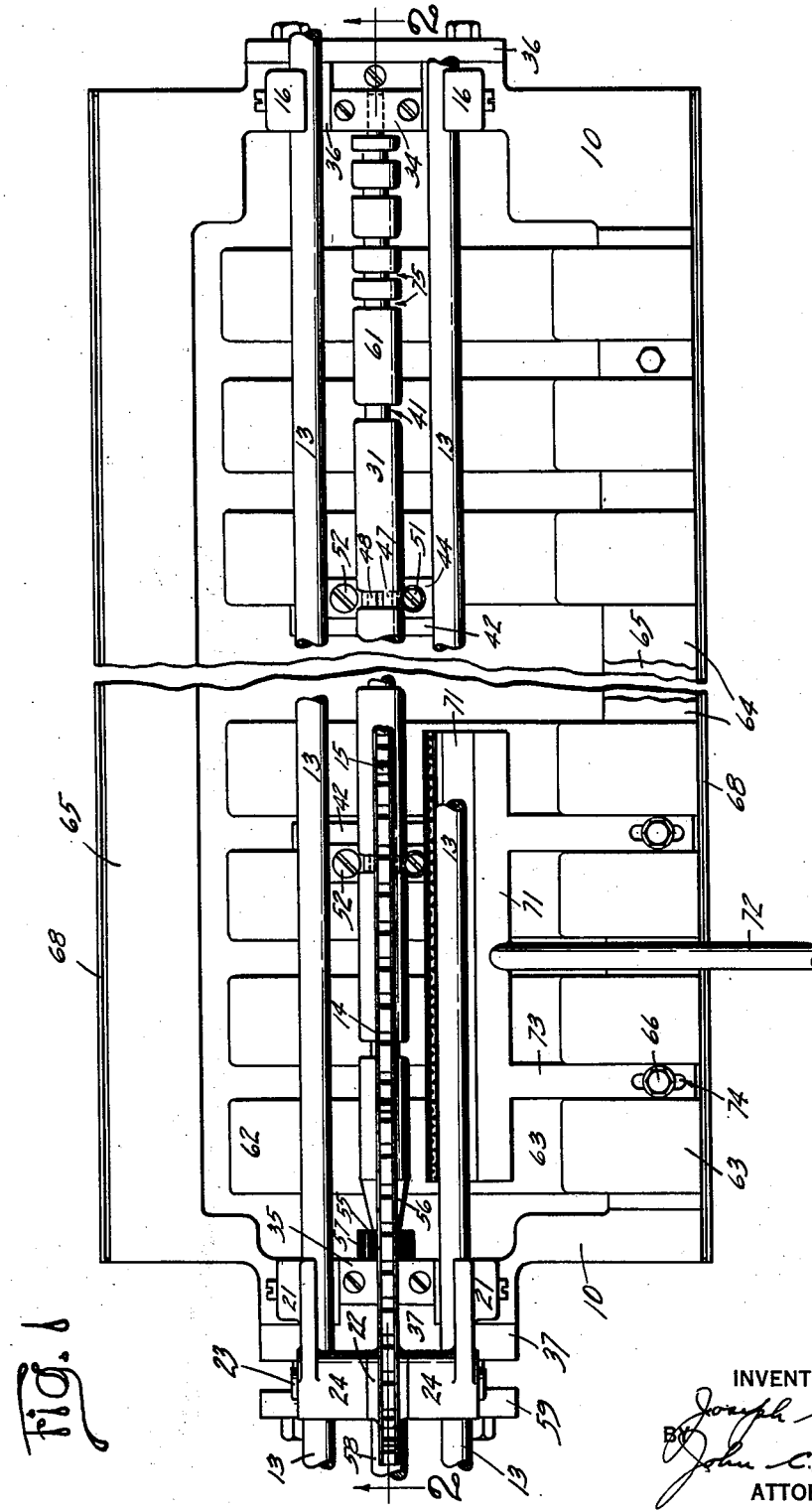
INVENTOR
Joseph Cereghino
BY John C. Carpenter
ATTORNEY

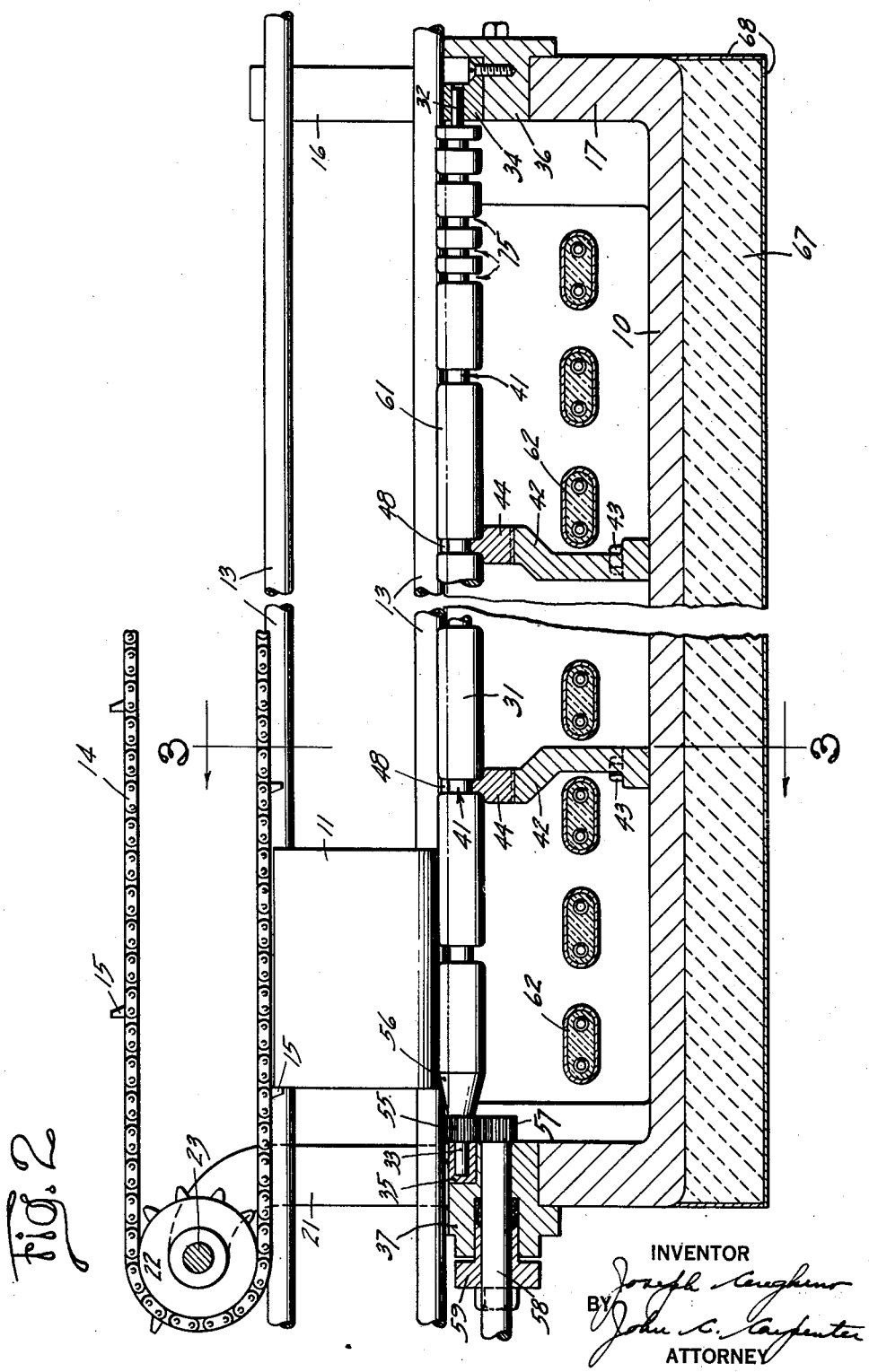

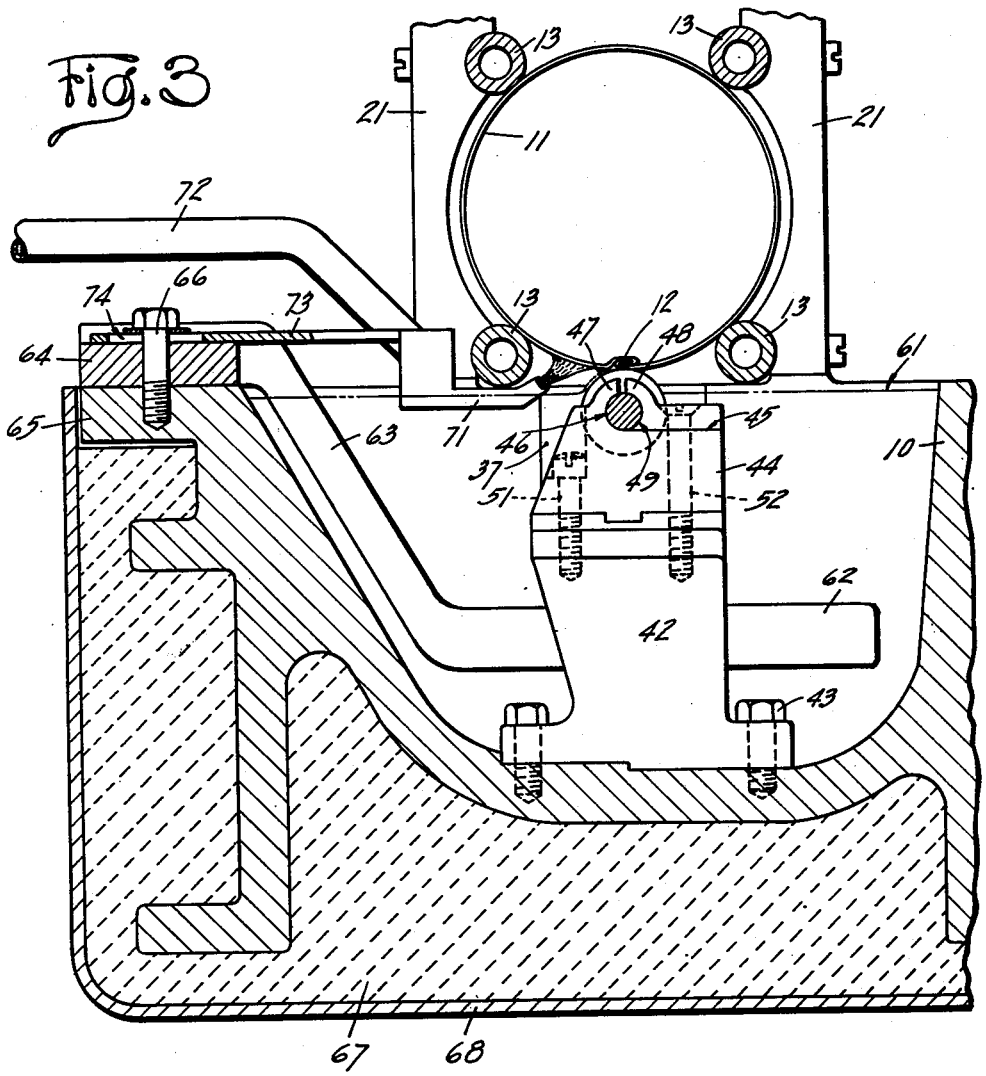

Patented July 6, 1937

2,085,737

UNITED STATES PATENT OFFICE 2,085,737

CAN SOLDERING MACHINE

Joseph Cereghino, Los Angeles, Calif., assignor to American Can Company, New York, N. Y., a corporation of New Jersey Application April 13, 1933, Serial No. 665,934

5 Claims. (Cl. 113—60)

The present invention relates to the soldering of side seams of can bodies and has for its object broadly improvement in the resultant seams through the use of a reduced amount of solder.

Prior to the instant invention it has been generally and perhaps universally the custom to solder the ordinary side seam of the tin can of commerce by conveying the can body lengthwise and in contact with a long roll or cylinder turning in a bath of molten solder and transversely of the seam and can body travel to convey the solder from the bath into contact with the seam as it moves to transfer the solder into the seam. In order that the soldering may be satisfactorily accomplished and the seam suitably sweated or maintained hot to insure complete union throughout the seam, the solder roll cylinder has of necessity had substantial length.

Accuracy of contact is necessary between the surface of the solder roll throughout its length and the can body seam as it passes, and on this account rolls of substantial diameter of upwards of three inches have been employed to provide necessary rigidity and to insure against sag intermediate the ends of the rolls, which would or might interfere with the uniformity of contact between the horizontally moving can body and the roll. Rolls of such diameter have provided a wide band of engagement between the can body at and adjacent the seam and the solder film or coating of the roll as it rotates to carry the solder to the seam. Such wide band of engagement continuously extending in contact with the can body has resulted in application of excess solder throughout the band with resultant functionless consumption of solder so far as the parts of the band outside the seam are concerned. Such a band also limits the surface area on the body wall which is available for lithograph coating or printing.

The large diameter heretofore believed necessary in solder rolls of this character has also resulted in a relatively long arc of solder travel from the surface of the bath to the seam with resultant opportunity for oxidation of the solder because of the exposure to the air. Accordingly, the solder introduced into the seam has been impure to the extent to which such oxidation has proceeded.

A principal object of the present invention is the provision of a solder roll which will be so constructed, arranged and mounted as to accurately deliver the solder and substantially confine it to the side seams of the can bodies as they pass lengthwise of the roll. Accomplishment of this purpose results in a considerable saving of solder and renders unnecessary the wiping of the seams by external rotating or other wipers to recover solder from the wide band areas already mentioned, and also permits of extension of the lithographing much closer to the side seams than has heretofore been practical.

Another important object of the invention is the provision of a solder roll which will be so constructed, arranged and mounted as to reduce opportunity for oxidation of the solder in its transfer from the bath to the seam. Accomplishment of this purpose results in the production of improved seams, since the solder may be introduced into them with minimum metal oxides which are and would be without holding power and would detract from both the strength and hermetic character of the seam.

Structurally the invention contemplates the provision of a roll of much less diameter than has heretofore been usable (less than a maximum of substantially two inches and preferably of and less than one and one-half inches). Structurally, also, the invention contemplates the supporting of this roll intermediate its ends against both vertical and lateral deflection, to the end that the predetermined accurate relationship between the top surface of the roll and/or its solder film may be uniformly maintained throughout the length, preferably in substantially a line contact.

The invention has for a further important object improvement in roll mountings to the end that the rolls may be more readily installed and removed and with the disturbance of a minimum number of parts.

Another important object of the invention is the construction of the rolls so that excess solder entering the seam or applied to the seam may be drained or scraped away by the roll itself.

Numerous other objects and advantages of the invention will be apparent as it is better understood from the following description, which, taken in connection with the accompanying drawings, discloses a preferred embodiment thereof.

Referring to the drawings:

Figure 1 is a plan view with parts broken away of a soldering machine embodying the present invention;

Fig. 2 is a longitudinal sectional view of the machine taken substantially along the line 2—2 in Fig. 1; and Fig. 3 is an enlarged transverse sectional view taken substantially along the broken line 3—3 in Fig. 2.

The soldering machine disclosed in the drawings as a preferred embodiment of the present invention is illustrated for soldering the side seams of can bodies as the latter are conveyed in continuous procession over a solder bath or molten solder receptacle. Such can bodies may come directly from the body forming machine in which the bodies are formed with their side seams and it is to the proper placing of the molten solder into such side seams and to the control of the amount of the solder brought into the seam that the present invention is particularly concerned.

The solder bath or receptacle used for holding the solder is shown in the drawings as a cast iron pot or tank 10. Can bodies 11 having side seams 12 are received for the soldering operation and are conveyed over and lengthwise of the tank and along a horizontal path. In this travel they are guided between four parallel guide bars 13, by a conveyor chain 14 having spaced flights or lugs 15 which engage back of the body and drag it along its way.

The guide bars 13 at the forward end of the machine are supported in a bracket 16 carried upon an end wall 17 of the solder receptacle and at the opposite or can body receiving end are suitably supported in brackets 21 mounted upon and extending upwardly from the opposite end wall of the solder receptacle. The conveyor chain 14 at the receiving end of the machine passes over a sprocket 22 which is mounted upon a horizontal shaft 23 journaled in bearings 24 formed in the upper ends of the brackets 21. This conveyor chain may be operated in any suitable manner to carry its lower run longitudinally of and between the upper guide bars 13.

During passage of the can bodies over the solder receptacle 10 their side seams pass along the upper exposed surface of a horizontal soldering roll 31 which is formed with reduced ends 32, 33 journaled in bearing members 34, 35. This roll is of a maximum diameter less than two inches and preferably between one and one eighth inches and one and one half inches. (The range of diameters of rolls in this type of soldering apparatus have been from a minimum of about three inches up).

The bearing member 34 is carried in an insert block 36 held in liquid-tight position in the front end wall 17 of the receptacle 10 and the bearing member 35 is similarly held in an insert block 37 which is mounted in liquid-tight position within the rear end wall of the receptacle.

The soldering roll 31 is annularly grooved intermediate its ends as at 41 and certain of these grooved sections are supported, this being in addition to the supports in the end bearings 34, 35. Brackets 42 (Figs. 2 and 3) rest upon the bottom of the solder receptacle 10 and are held in position by bolts 43. A spacer block 44 is mounted upon each bracket 42 and its upper edge is formed with a horizontal wall 45 which merges at one end into a pocket section 46 formed in an extension 47.

A removable bearing cap 48, formed with a pocket section 49, rests on the surface 45 of each spacer block and cooperates with the extension 47 to hold the soldering roll in rotatable position. Each extension 47 and associated bearing cap 48 project into a roll groove 41 the reduced diameter of the roll at the base of its groove having rotatable support in the pocket formed by the parts 46, 49. This construction prevents longitudinal shifting of the roll while holding it for free rotation. A bolt 51 connects one side of each block 44 to its bracket 42 and a screw 52 on the opposite side passes through the removable bearing cap 48, through the spacer block 44, and into the bracket 42 and holds the parts together.

The soldering roll 31 is continually rotated during the soldering operations and is formed with gear teeth 55 adjacent its rear end 33. The diameter of this gear section is less than the diameter of the soldering roll 31 and the former, therefore, offers no obstruction to the passing can bodies, a tapered surface 56 providing a junction for the gear section and the larger part of the roll.

It will be observed by reference to Fig. 2 that the end and intermediate mountings of the soldering roll 31 are such as to provide an easy assembling operation when the roll is first brought into place within the solder bath. Such assembling of the parts is made by vertically lowering the bearing members 34, 35 into their respective seats, the roller ends 32, 33 having been previously placed in their bearings. At the same time the spacer blocks 44, which with their bearing caps 48 have been assembled on the roll, move into position onto their brackets. This construction also allows for easy removal of a soldering roll 31 and does not necessitate the exceedingly difficult operations of taking out roller shafts through the solder bath end walls as is necessary in many roller soldering machines of usual construction.

During this vertical placing of the soldering roll 31 within the solder receptacle 10 when assembling, connection is easily made with actuating devices for rotating the roller. The gear section 55 merely drops into mesh at such a time with a gear 57 formed on the inner end of a horizontal shaft 58 which extends through the end block 37. This shaft constitutes an actuating element for rotation of the gear 57 and the soldering roll 31 through its gear teeth 55. A stuffing box 59 may be provided for the shaft 58 to prevent leakage of solder. This shaft is the only moving part that extends through the side or end walls of the receptacle.

The solder receptacle 10 is adapted, when the machine is in operation, to hold a mass of molten solder, the upper level of which, indicated by the dot and dash lines marked with the numeral 61 in Figs. 2 and 3, is just below the top of the soldering roll 31. In other words, the roll 31 is for the most part submerged in the solder.

Any suitable heating means may be used for keeping the solder in the bath in molten condition. As an example of one form of such heating means the drawings disclose electrical heating units 62 which extend down into the solder bath below the solder level and under the soldering roll 31. Each unit is connected, through an inclined part 63, with a support bar 64. The bar 64 is carried on an upper, horizontal flange 65 of the solder receptacle 10 and is held in place by bolts 66.

The solder receptacle 10 is preferably insulated against heat radiation by having its bottom and sides surrounded with a refractory material designated generally by the numeral 67 around which an outside casing 68 may be used.

Provision is made for heating the wall of the can body 11 adjacent its side seam 12 when the can body is first introduced into the soldering machine and as it begins its travel over the soldering roll 31. Such separate heating may be accomplished by a series of gas flames projected against the body wall adjacent the side seam, a perforated burner head 71 (Figs. 1 and 3) being provided for this purpose. This flame discharging head is located alongside of the soldering roll 31. This heater is separate in the sense that as a heater it is independent of and separate from the heat furnished by the solder and its applying roll.

The roll 31 is of such a small diameter that the burner head is placed just outside of the path of the walls of advancing can bodies and very close to their side seams. This allows for close application of the flame to the body walls very near to the point of soldering and insures thorough and rapid heating of the side seam receiving the molten solder. This side seam has previously been fluxed just before coming into position over the soldering roll and the heated walls of the can body seam draw the molten solder into all of the interstices of the seam, thus forming a fully sweated joint.

The burner 71 is connected with a gas supply pipe 72 which receives an inflammable gas supply from any suitable source. Supporting straps 73 are preferably mounted on the heating bar 64 and are held in position by the same bolts 66 as are used for the heating bar. Each strap 71 may be slotted at 74 to permit accurate positioning of the burner 71 relative to the path of the passing can bodies.

It will be observed that the film of solder raised by the rotating solder roll from the surface of the molten solder is very small in area and this small amount of exposure to the atmosphere is not sufficient to allow for any substantial oxidation of the solder. A cleaner solder is thus brought up into the side seam. It will also be observed by reference to the same figure that the solder is delivered into the side seam and is not smeared over or flooded on the exterior surfaces of the can body wall.

By reason of the accurate placing of just sufficient solder for the joint it is not necessary to subsequently wipe the seam as is usual in can body seam soldering, there being no excess solder to be removed by the wiper. To more fully control the solder amount and insure uniformity in the seam, however, the forward end of the soldering roll 31 may be annularly grooved at 75 and the walls and edges of these grooves drag against the soldered joint and scrape off any unnecessary solder should there be an excess. Such scraping action is in effect a draining of the seam joint which is similar to the action performed by wipers in the ordinary soldering machine without the spreading action of the usual wiper.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for soldering the side seams of can bodies, the combination of a receptacle for molten solder, a conveyor adapted to convey the can bodies in a horizontal path lengthwise of said receptacle and above said molten solder, a solder roll extending lengthwise of said receptacle and parallel to the can bodies and of diameter substantially not in excess of two inches, said roll having spaced portions of reduced diameter intermediate its ends, and means secured to said receptacle and engaging said reduced portions for supporting said solder roll from beneath to prevent vertical downward deflection.

2. In a machine for soldering the side seams of can bodies, the combination of a receptacle for molten solder, a conveyor adapted to convey the can bodies in a horizontal path lengthwise of said receptacle and above said molten solder, a solder roll extending lengthwise of said receptacle and parallel to the can bodies and of diameter substantially not in excess of two inches, said roll having spaced portions of reduced diameter intermediate its ends, and having means secured to said receptacle and engaging said reduced portions for confining said solder roll against lateral deflection.

3. In a machine for soldering the side seams of can bodies, the combination of a receptacle for molten solder, a small diameter, annularly grooved soldering roll mounted in said receptacle for lifting molten solder therefrom, a conveyor adapted to carry can bodies across said receptacle and with their side seams presented to said roll, and intermediate supporting members extending into certain of the grooves of said roll for rotatably supporting it intermediate its ends while holding it against longitudinal movement, other of said grooves of said soldering roll removing surplus solder from the side seams of said can bodies.

4. In a machine for soldering the side seams of can bodies, the combination of a receptacle for molten solder, a small diameter soldering roll mounted in said receptacle for lifting molten solder therefrom, a conveyor adapted to carry can bodies in a horizontal path across said receptacle and with their side seams presented to said roll, heating means within the solder of said receptacle for keeping it in molten condition, and separate can body heating means located above said receptacle and alongside of said solder roll for heating the side seams of said passing can bodies.

5. In a machine for soldering the side seams of can bodies, the combination of a receptacle for molten solder, an annularly grooved, rotatable, elongated, small diameter soldering roll for applying solder to can bodies, end bearing members for rotatably supporting the ends of said rolls, and intermediate bearing members for rotatably supporting its intermediate sections adjacent the grooves, gear teeth carried by said roll, and roll actuating means including an actuating gear within said receptacle so as to be immersed in the molten solder of said receptacle for rotating said roll when in solder applying position, said roll being assembled in said receptacle and in its solder applying position within its ends and intermediate supporting members by vertical movement which brings its said gear teeth into mesh with said actuating gear.

JOSEPH CEREGHINO.